United States Patent [19]

Nakajima et al.

[11] 3,796,090
[45] Mar. 12, 1974

[54] DEVICE FOR MEASURING SWELLING OF MATERIAL

[75] Inventors: Yosuke Nakajima; Katsuhiko Ohtani, both of Kanagawa, Japan

[73] Assignee: Fuji Photo Film Co., Ltd., Minami Ashigara-shi, Kanagawa, Japan

[22] Filed: July 14, 1971

[21] Appl. No.: 162,460

[30] Foreign Application Priority Data
July 14, 1970 Japan.............................. 45-61573

[52] U.S. Cl. .................................................. 73/73
[51] Int. Cl. ............................................ G01n 19/00
[58] Field of Search ............... 73/73, 78, 81, 83, 91, 73/90, 94, 102, 108, 105, 337; 33/169 A

[56] References Cited
UNITED STATES PATENTS
2,418,916   4/1947   Weaver..................................... 73/81
3,404,564   10/1968  Rapp..................................... 73/94 X
3,419,964   1/1969   Hennigan.............................. 73/73 X
3,503,253   3/1970   Budd et al. ............................. 73/81

FOREIGN PATENTS OR APPLICATIONS
193,768   5/1967   U.S.S.R................................... 73/81

Primary Examiner—James J. Gill
Assistant Examiner—Anthony V. Ciarlante
Attorney, Agent, or Firm—Sughrue, Rothwell, Mion, Zinn & Macpeak

[57] ABSTRACT

A cam operated cyclically shifted holder moves a weight toward and away from an underlying material to measure the degree of swelling of liquid absorbed by the material by means of a device which measures the pressure acting on the material due to the oscillating weight.

4 Claims, 4 Drawing Figures

PATENTED MAR 12 1974  3,796,090

INVENTORS
YOSUKE NAKAJIMA
KATSUHIKO OHTANI

BY Sughrue, Rothwell, Mion,
Zinn & Macpeak

ATTORNEYS

DEVICE FOR MEASURING SWELLING OF MATERIAL

BACKGROUND OF THE INVENTION

1. Field of the Invention

The present invention relates to a device for measuring swelling degree in a high molecular weight material.

2. Description of the Prior Art

Generally, there are many devices for measuring swelling degree, and they are classified into the following three groups:

1. A method of obtaining the swelling degree of a material by measuring the amount of water absorbed by ascertaining the difference between the weight of the original material and that of the material after swelling;

2. A method wherein water is passed over a sliced thin piece of material to be measured. Then, the variation of the sliced piece is converted to that of the speed of water, that is, the pressure thereof. By measuring the pressure, the variation of the thickness of the sliced thin piece (swelling degree) is obtained;

3. A method of obtaining a swelling degree of a material by converting the variation in thickness of a sliced piece of the material into the variation of focus of a microscope.

But these conventional methods have the following defects, which makes it impossible to conduct the measurement promptly and automatically.

That is, method (1) has the merit that it needs no specific apparatus but neither a prompt measurement nor automatic measurement is possible.

Method (2) has such merits that continuous measurement without any damage on the surface of a film is possible and liquid for measurement can be refreshed. On the other hand, it has such defects that operation is complicated, and it takes a long period of time to prepare the measurement system.

Method (3) has such merit that since no force is applied to the surface of the film, the correctness of measurement is very high, but by the method, a prompt and continuous measurement is impossible, and it has also such defect that the operation requires great skill owing to manual operation.

SUMMARY OF THE INVENTION

An object of the present invention is to provide a valuable swelling degree meter without accompanied defects as shown in the aforesaid conventional arts.

That is, the object of the present invention is to provide a system of measuring the degree of swelling having advantages as mentioned below.

1. The measurement of swelling degree can be made promptly, continuously and automatically.

2. It is possible to measure the speed of swelling as well as balancing degree of swelling.

3. The pressure applied to a swelling film to be measured is low.

4. It is also possible to measure a strength of the film, and the measurement can be operated easily and liquid for measuring can be readily changed.

BRIEF DESCRIPTION OF THE DRAWINGS

The present invention is explained in detail according to drawings which show an embodiment of this invention, in which.

DESCRIPTION OF A PREFERRED EMBODIMENT

Figure 1:
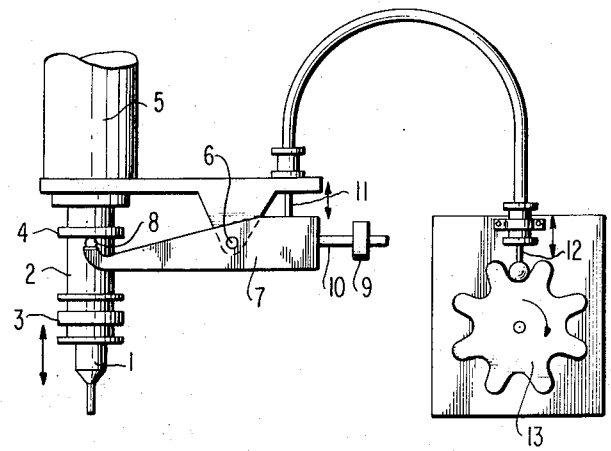
FIG. 1 is a front view showing a vertically moving mechanism of a detector of a device for measuring swelling degree.

FIG. 1 shows a main part of the present invention, a detector 1 which is brought into contact with a surface of a film is fixed at the under part of a holder 2 which is moving vertically. The top end of the detector 1 is made flat or globular. On the holder 2 are mounted a weight 3 which is easily changed according to an object to be measured and a mounted flange 4. This holder 2 is set under a well known film pressure meter 5 using a difference of pressure to sense the degree of swelling in a sample. Accordingly, vertical movement of the holder 2 is measured by the film pressure meter 5. A ball bearing 8 which is set at the left side of a lifter 7 is brought into contact with the bottom surface of the fixed flange 4. The center of the lifter 7 is pivoted at a point 6. According to the swing of the lifter 7, the holder 2 is arranged to move vertically. Besides, on the bottom surface of the flange, a balance weight 9 is set at the right end of the lifter 7 to force it upwards. When the weight 3 is not applied, the whole weight of the holder 2 is balanced with this balance weight 9, and the measuring pressure is regulated to be zero. At the right end of the upper surface of the lifter 7, a top end 11 of a cable for a cable release is brought into contact, and makes contact at another end 12 of the cable via the cable release with a wave like cam 13. A weight 3 is applied to holder 2.

As mentioned above, by the rotation of the cam 13, the lifter 7 is made to move vertically and the detector 1 is moved vertically with a slight measuring pressure and the degree of swelling is measured. About 0.5 g/mm² of weight gives no such trouble in measuring as to produce a hollow or depression in the film. A hollow after swelling, that is to say, a degree of the strength of the film is measured by increasing in weight of weight 3 and making the weight 3 sink into the film.

Figure 2:
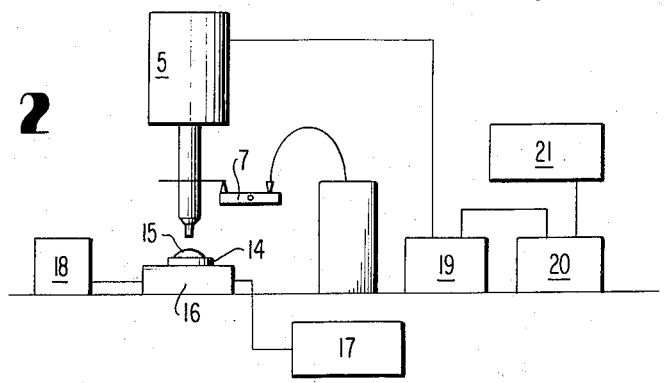
FIG. 2 is a schematic view of a whole system recording automatically the swelling degree by using the device of the present invention.

As shown in FIG. 2, which is a whole side diagrammatic view of the meter that measures the degree of swelling, a sample 14 has a liquid to be measured 15 thereon and is fixed on a sample table 16. The sample table 16 and the measured liquid 15 are kept at a constant temperature by a tank 18 in which a fluid of constant temperature is circulated. A change at a portion of different pressure, that is a change of the thickness of a film received by the main portion 5 of a film thickness measuring meter by a difference in pressure, is read through a meter 19 and is automatically recorded on a recorder 21 by the aid of an adapter 20.

Briefly, therefore, the mode of operation consists of balancing the lifting arm and weight so that essentially no force is exerted on the sample 15; the sample is wetted; the lifting arm 7 is oscillated slightly to produce a regular, cyclic loading of the sample 15; as the sample swells, it tends to support more of the weight, thus reducing stroke of the probe 1; and the change in stroke length over each cycle is monitored by elements 5, 19, 20 and 21 as the parameter proportional to sample swelling.

Figure 3:
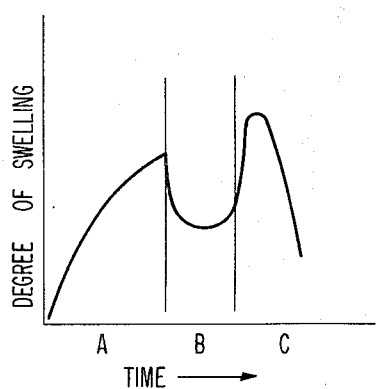

In FIG. 3, a sample of a graph of the degree of swelling is shown. The graph shows swelling states of a film in processes of developing (A), fixing (B), and washing (C).

Figure 4:
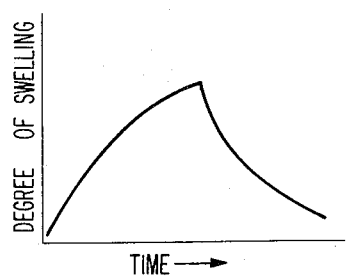
FIG. 3 and FIG. 4 are graphs showing the relations of the variations of swelling degree as time passes, measured by the device of the present invention.

FIG. 4 shows a sample of measuring hollows.

By the present invention, various kinds of measuring that are impossible in general methods become possible. That is to say:

1. It becomes possible to measure degrees of swelling in moving states in the processes of developing, fixing and washing of emulsion, for it is possible to measure rapidly and automatically by continuous up and down movement of a detector caused by a rotation of a cam with short cycle repeating measurement of the degree of swelling.

2. The degree of swelling is known from a self recording chart on which automatically measured data are recorded.

3. As the pressure applied on the swelling film is made small by balancing, it becomes possible to measure the degree of swelling of very thin film of the emulsion layer.

4. By increasing in weight the information of or depression, a hollow is measured and the degree of the strength of the film can be measured.

5. Operation of the device is very simple and the change of the measuring liquid is done easily.

What is claimed is:

1. A device for measuring the degree of swelling of a high molecular weight material, said swelling caused as a result of liquid absorbed by said material, said device comprising:

a detector adapted for contacting the surface of said material, a weight holder attached to said detector and overlying said material, said weight holder carrying a weight for forcing said detector into contact with said material, and a cyclically operated lifter for vertically lifting said holder and said weight away from said material, said lifter including an arm pivotably mounted at a point along its length such that one end of said arm is operatively connected to said weight holder, the opposite end of said arm being operatively connected with a repetitive reciprocating motion generating means, said other end of said arm further including an adjustable balance weight thereon, said balance weight adapted for balancing said holder and said detector at a zero pressure division when no weight is being carried by said weight holder, whereby the measured distance of pressure applied to and supported by said material during oscillation of said holder is indicative of the degree of swelling of said material caused by absorption of liquid thereby, and an oscillation monitoring means for monitoring the oscillation of said holder where the output of the monitoring means is indicative of the degree of swelling of said material caused by absorption of liquid thereby.

2. The device as claimed in claim 1, wherein said weight is removably coupled to said holder permitting weights of various sizes to be applied to said material.

3. The device as claimed in claim 1, further comprising cam operated means contacting one end of said lifter to effect vertical oscillation of the same.

4. The device as claimed in claim 2, further comprising cam operated means contacting one end of said lifter to effect vertical oscillation of the same.

* * * * *